(12) United States Patent
Kumar et al.

(10) Patent No.: US 8,942,970 B2
(45) Date of Patent: Jan. 27, 2015

(54) METHOD FOR CONFIGURING AN INTELLIGENT ELECTRONIC DEVICE AND A SUBSTATION AUTOMATION SYSTEM

(75) Inventors: Sasi Kumar, Vengipalayam (IN); Vivek Gopalakrishnan, Vellore (IN); Tobias Gentzell, Västerås (SE); Ganesh Kulathu, Karnataka (IN)

(73) Assignee: ABB Research Ltd., Zürich (CH)

( * ) Notice: Subject to any disclaimer, the term of this patent is extended or adjusted under 35 U.S.C. 154(b) by 311 days.

(21) Appl. No.: 13/381,008

(22) PCT Filed: Dec. 9, 2009

(86) PCT No.: PCT/IB2009/007686
§ 371 (c)(1),
(2), (4) Date: Mar. 22, 2012

(87) PCT Pub. No.: WO2010/150048
PCT Pub. Date: Dec. 29, 2010

(65) Prior Publication Data
US 2012/0191959 A1 Jul. 26, 2012

(30) Foreign Application Priority Data
Jun. 26, 2009 (IN) .......................... 1501/CHE/2009

(51) Int. Cl.
G06F 9/45 (2006.01)
H04L 29/08 (2006.01)
(Continued)

(52) U.S. Cl.
CPC ........... *H04L 67/306* (2013.01); *H02J 13/0006* (2013.01); *H02H 1/0061* (2013.01); *H04L 67/125* (2013.01)
USPC ....................................................... 703/22

(58) Field of Classification Search
CPC .. H04L 67/306; H02J 13/0006; H02H 1/0061
USPC .................................................. 703/22; 713/1
See application file for complete search history.

(56) References Cited

U.S. PATENT DOCUMENTS

| 7,734,359 | B2* | 6/2010 | Deveaux et al. ................. 700/83 |
| 8,156,061 | B2* | 4/2012 | Vetter et al. ..................... 706/45 |
| 8,165,841 | B2* | 4/2012 | Vetter et al. ................... 702/122 |

(Continued)

FOREIGN PATENT DOCUMENTS

| DE | 103 07 332 A1 | 9/2004 |
| EP | 1 850 109 A1 | 10/2007 |

(Continued)

OTHER PUBLICATIONS

Apostolov, A., and B. Muschlitz. "Object modeling of measuring functions in IEC 61850 based IEDs." Transmission and Distribution Conference and Exposition, 2003 IEEE PES. vol. 2. IEEE, 2003.*

(Continued)

*Primary Examiner* — Aniss Chad
(74) *Attorney, Agent, or Firm* — Buchanan Ingersoll & Rooney PC (57) ABSTRACT

A method is disclosed for configuring an intelligent electronic device (IED) that includes enabling dynamic capability of the IED by a flexible data modeling technique to dynamically adapt a data model based on an application requirement using a configuration tool. A substation automation system is also disclosed which includes a local system equipment having a plurality of IEDs associated with the local system equipment and an IED configuration tool configured to interact with the firmware of each IED to configure the IED based on application requirements. The application configuration tool can include dynamic capability information of the IED to enable a flexible data model in the IED.

8 Claims, 7 Drawing Sheets

(51) Int. Cl.
*H02J 13/00* (2006.01)
*H02H 1/00* (2006.01)

(56) References Cited

U.S. PATENT DOCUMENTS

| | | | |
|---|---|---|---|
| 8,265,908 B2* | 9/2012 | Kirrmann et al. | 702/188 |
| 8,363,659 B2* | 1/2013 | Wimmer | 370/395.53 |
| 8,392,557 B2* | 3/2013 | Hilpert et al. | 709/224 |
| 8,527,652 B2* | 9/2013 | Wimmer | 709/232 |
| 8,532,944 B2* | 9/2013 | Vetter et al. | 702/57 |
| 2008/0127210 A1* | 5/2008 | Bosold et al. | 719/313 |
| 2008/0244044 A1 | 10/2008 | Wimmer | |
| 2009/0070051 A1 | 3/2009 | Vetter et al. | |
| 2010/0020724 A1 | 1/2010 | Wimmer et al. | |
| 2013/0055389 A1* | 2/2013 | Alvarez et al. | 726/22 |

FOREIGN PATENT DOCUMENTS

| | | |
|---|---|---|
| EP | 1 976 177 A1 | 10/2008 |
| EP | 1 976 218 A1 | 10/2008 |

OTHER PUBLICATIONS

Baigent, Drew, et al. "IEC 61850 communication networks and systems in substations: an overview for users." SISCO Systems (2004).*

Flores et al., "Case Study: Design and Implementation of IEC 61850 From Multiple Vendors at CFE La Venta II", IEEE, 2007, pp. 307-320.

Brand, "IEC 61850 Short Tutorial", Internet Citation, Mar. 2005, pp. 1-34, http://www.ceb5.cepel.br/arquivos/eventos.setor/iec61850_tutoria.pdf.

Brunner, "IEC 61850 Object Model and Configuration Language", Internet Citation, Mar. 2003, pp. 1-23, http://www.pes-psrc.org/h/H5/H5-Brunner_61850-intro.pdf.

Kostic et al., "Understanding and using the IEC 61850: a case for meta-modelling", Computer Standards & Interfaces, Jun. 2005, pp. 679-695, vol. 27, No. 6.

International Search Report (PCT/ISA/210) issued on Aug. 4, 2010, by Indian Patent Office as the International Searching Authority for International Application No. PCT/IB2009/007686.

* cited by examiner

METHOD FOR CONFIGURING AN INTELLIGENT ELECTRONIC DEVICE AND A SUBSTATION AUTOMATION SYSTEM

The invention relates generally to the field of Substation Automation, and more specifically to the configuration of intelligent electronic devices deployed in the substations.

BACKGROUND

An electrical or power substation involves electricity transmission and distribution systems where voltage is transformed from high to low or the reverse using transformers. Electric power may flow through several substations between generating plant and consumer, and in the process being transformed through many voltage levels in several steps.

Appropriate equipments are selected for these functions depending on whether the substation is a transmission, sub-transmission or distribution substation. These equipments could include transformers, reactors, capacitor banks, circuit breakers, disconnector switches etcetera. Substation Automation involves protection, control, monitoring and metering functions of the above mentioned equipment and derives reliable information for efficient functioning of the substation. Currently different types of Intelligent Electronic Devices (IEDs) are used in a Substation Automation (SA) system to cater to protection, control, monitoring and metering functions of different substation equipment. The IEDs are microprocessor-based controllers of power system equipment, such as circuit breakers, transformers, and capacitor banks. Typically, the IEDs receive data from sensors and power equipment, and can issue control commands, such as tripping circuit breakers if they sense voltage, current, or frequency anomalies, or raise/lower voltage levels in order to maintain the desired level. Common types of IEDs include protective relaying devices, load tap changer controllers, circuit breaker controllers, capacitor bank switches, recloser controllers, voltage regulators, etc. These IEDs are advantageous because, with the available microprocessor technology a single unit can perform several protection, metering, monitoring and control functions concurrently.

Substation Automation forms an important and complex aspect for maintenance and control of different equipments involved in different processes within the substation. The IEDs deployed in SA systems use communication protocols to communicate substation equipment data to each other. Multiple protocols exist for Substation Automation, which include many proprietary protocols with custom communication links However, interoperation of devices from different vendors is highly desired for simplicity in implementation and use of Substation Automation devices.

The IEC61850 standard from International Electrotechnical Commission (IEC) is a standard for communication networks and systems in substation, which advocates interoperability amongst Intelligent Electronic Devices (IEDs) from various manufacturers using common engineering models, data formats and communication protocol. Recent IEDs are designed to support the IEC61850 standard for substation automation by implementing the IEC61850 profiles as per the application requirements, thereby providing interoperability and advanced communications capabilities and these IEDs are termed as IEC61850 compliant IEDs. Hereinafter the term IED should be interpreted as IEC61850 compliant IED unless specified otherwise.

IEC 61850 features include data modeling where complete functionality of the substation is modeled into IEC61850 logical nodes (LN) that are grouped and arranged under different logical devices (LD). Logical nodes are the smallest part of a device model that represents a function in an IED. The data published by this function are represented as data objects under these LNs. Logical devices are virtual devices that exist to enable aggregation of logical nodes, data sets and control blocks for communication purposes.

The IEC61850 based IEDs currently support only the fixed number of preconfigured Logical Nodes out of the available Logical Nodes in IEC61850 standard based on the fixed number of physical inputs from associated power system equipment. The preconfigured Logical Nodes described herein above mean that few of the IEC61850 Logical Nodes are implemented in the IED based on its physical capability, real-world application support and the common understanding with the IED application configuration tool. This puts a limitation on expandability of these IED configurations with respect to IEC61850. Further, the bay level functionality extension is not possible with the existing devices as there are physical IOs and IEC61850 logical nodes insufficiency. The functionality extension is defined herein as extending the real world application/function performed by the IED dynamically based on its physical capability.

For example, a substation has an IEC61850 compliant IED that supports only a LN of class GGIO (logical node pertaining to Generic Input Outputs). In future, the substation requires transferring of various signals like Temperature Alarm, Pressure Alarm etc. to a control station. For being capable of doing this the IED should also support SIMG (represents Insulated Medium Supervision for Gas) logical node class as well dynamically (Enabling the related functional block, logical nodes, etc., during reconfiguration using the IED application configuration tool), which is not available in the current IEDs and IED configuration tools.

The current IEDs do not support adaptive reconfiguration (configuring an IED functionalities as per the real-world application requirements) of the IEC61850 data model and hence a need such as extension of the data objects in the logical nodes cannot not be fulfilled. Data object extension referred herein means aggregating the various number of data objects to group multiple binary input/output in a logical node. The data models in IEC61850 are used for description of the information produced and consumed by applications and for the exchange of information with other IEDs.

Therefore there is a need for flexibility in configuration of the IEC61850 data model in IEDs to support variations in information emanating from them like physical inputs, application function outputs that cannot be defined apriori. This adaptation implies a variable number of Data Objects, typically one per information element, in one or plurality of Logical Nodes in IEDs to suit the user or substation requirement.

BRIEF DESCRIPTION

In one exemplary embodiment, a method for extending features and/or flexibility of an intelligent electronic device (IED) used in a substation is provided; the method includes configuring the IED by enabling dynamic capability of the IED by using a flexible data modeling technique described in the present invention to dynamically adapt a data model based on on-site application requirement. The capability is characterized by logical node classes, data objects, logical node instances, physical field inputs, logical outputs or application outputs.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present technique provides a method for configuring an intelligent electronic device (IED) for exploiting or utilizing the capability of the intelligent electronic device by using a flexible data modeling technique to dynamically adapt an IEC61850 data model based on on-site application requirement, and thus enables the dynamic capability of the IED. The capability as mentioned herein is characterized by logical node classes (LN classes), data objects, logical node instances (LN instances), physical field inputs, logical outputs or application outputs in the intelligent electronic device. The dynamic capability as referred herein is a list of extendable functions of the IED. Each function from the list of extendable functions is represented as a logical node; each logical node represents multiple data objects, and these data objects are associated with one or more common data classes.

In one aspect, the present invention proposes a way to reconfigure a generic data object to one or plurality of logical node Classes. The IEDs that can be configured using this method include but are not limited to a Distributed & Intelligent I/O device, a Protection and Control Relay and a DCS Process Controller or a generic Process Controller.

According to aspects of the present technique, a user can create a Substation Configuration Description Language (SCL) file based on the application configuration using the IED configuration tool in two different ways. In one exemplary method, the IED configuration is done offline (also referred herein as "offline method") and the SCL file is generated by the IED application configuration tool based on the types and number of hardware modules in the IED, and the application needs. This SCL file is downloaded to the IED, where the firmware of the IED checks for the validity of the SCL file against its dynamic capability and creates an adaptive IEC61850 data model, as described herein below. Offline method maybe used by the Distributed & Intelligent I/O, Protection & Control IED and the DCS Process Controller in the exemplary embodiments. In another exemplary method (also referred herein as "online method") the configuration of IED is done online In this technique the IED application configuration tool retrieves the position, number and type of I/Os from the IED and the SCL file is generated based on this information and the application needs. Then the SCL file is downloaded to the IED, where the firmware of the IED checks for the validity of the file against its dynamic capability and creates the adaptive IEC61850 data model, as described herein below. Online method maybe used by the Distributed & Intelligent I/O IED in an exemplary embodiment.

Figure 1:
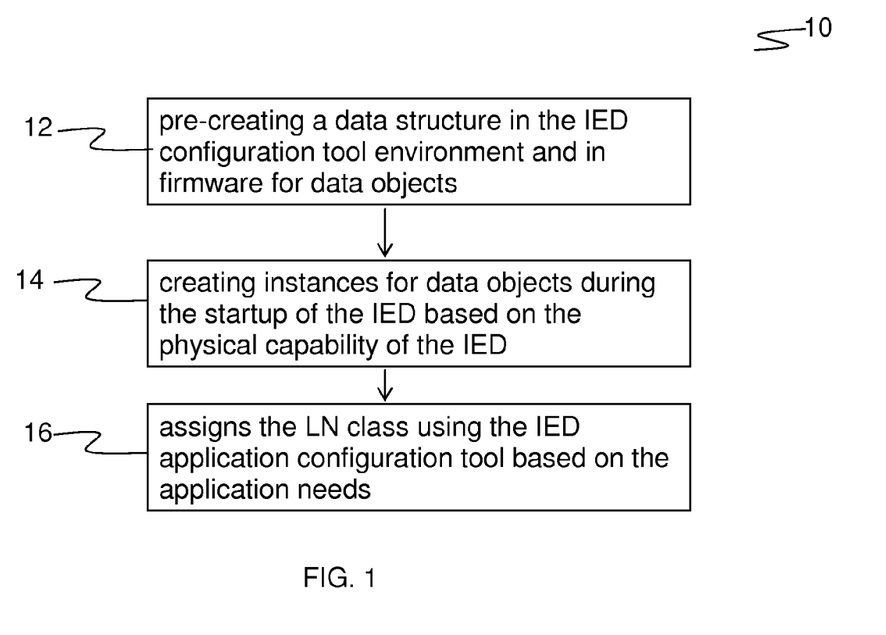
FIG. 1 is a flowchart depicting exemplary steps for creating another exemplary adaptive IEC61850 data model according to one aspect of the invention.

An exemplary adaptive IEC61850 data model as mentioned hereinabove is created using exemplary steps of the flowchart 10 as illustrated in FIG. 1 and includes in one example, at step 12 a data structure that is pre-created in the IED configuration tool environment and in firmware (for Distributed & Intelligent I/O) for data objects that essentially comprises of common data class mentioned in IEC 61850 and field for short address. Instances for data objects are created at step 14 during the startup of the IED based on the dynamic capability of the IED. These data object instances form the adaptive IEC 61850 data model. The user then assigns as shown at step 16 the LN class using the IED configuration tool, based on their application needs in any of the two different ways as described herein above (online method or offline method). Exemplary IEDs using this technique are Distributed & Intelligent I/O (can use online or offline configuration method) and Protection and Control IED (uses offline method in one example).

It would be appreciated by one skilled in the art that the IEDs support possible LN classes defined in IEC 61850 based on its dynamic capability. It may be noted here that the data type template in the SCL file consists of LN type definition for configured LN classes, and the values allowed for enumerations. The LN type definition consists of number of data objects for the corresponding LN class. The LN whose content is collection of data objects, each with its own short address, is created dynamically using the number of data objects, as defined in its corresponding LN Type, in accordance with the present technique. This process happens every time a new configuration file is received and for all configured LN classes of the SCL file. The short addresses in the LN and the data object instances have one-to-one mapping. This mechanism is used to fetch the real-time data from the data object instances.

Figure 2:
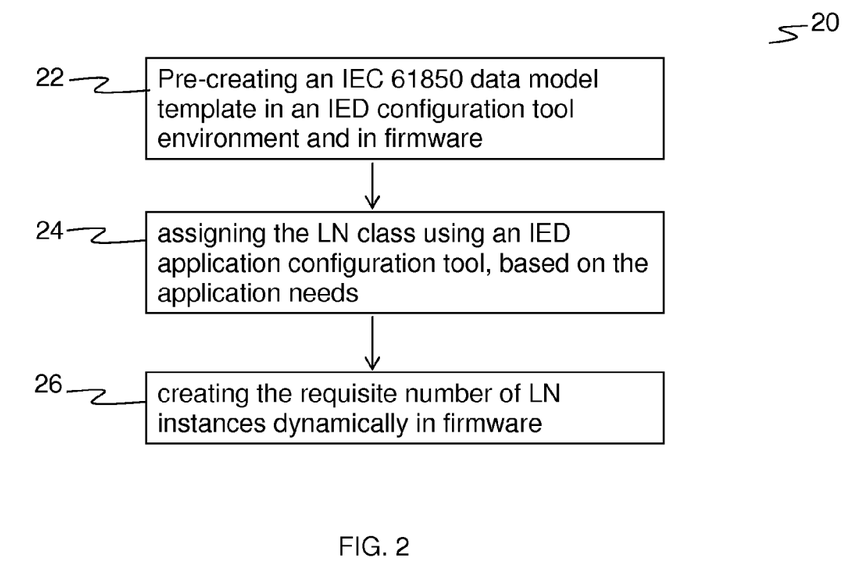
FIG. 2 is a flowchart depicting exemplary steps for creating an exemplary adaptive IEC61850 data model according to another aspect of the invention.

Another exemplary adaptive IEC61850 data model as mentioned herein above is created using exemplary steps of the flowchart 20 as illustrated in FIG. 2 and includes in one example, an IEC 61850 data model template that is pre-created in the IED configuration tool environment and in firmware based on the dynamic capability of the IED at step 22. The dynamic capability is defined herein as including the physical, logical, virtual capability of the IED. The virtual capability is defined herein as the capability of an IED that can translate the real world data acquired from one specific protocol in to number of IEC61850 data objects grouped under an IEC61850 logical node. The user then assigns at step 24, the LN class using the IED configuration tool, based on their application need. Based on the user configuration information, the needed numbers of LN instances are created dynamically at step 26, based on the corresponding LN type information from the IEC61850 data model template. Exemplary IED using this technique includes DCS Process Controller (using offline method as described hereinabove).

The adaptive data model technique as described here has several advantageous features. One such feature includes supporting of multiple LNs classes dynamically in an IEC 61850 compliant IED. With this feature, the support for a LN class is dynamically controlled for an IEC61850 IED like a Distributed & Intelligent I/O device or a Protection & Control relay.

EXAMPLE

A digital input in a Distributed Intelligent IO can be referred in GGIO for indication or general alarm and the same can be reconfigured in the SIMG for pressure alarm based on the applications need.

Figure 3:
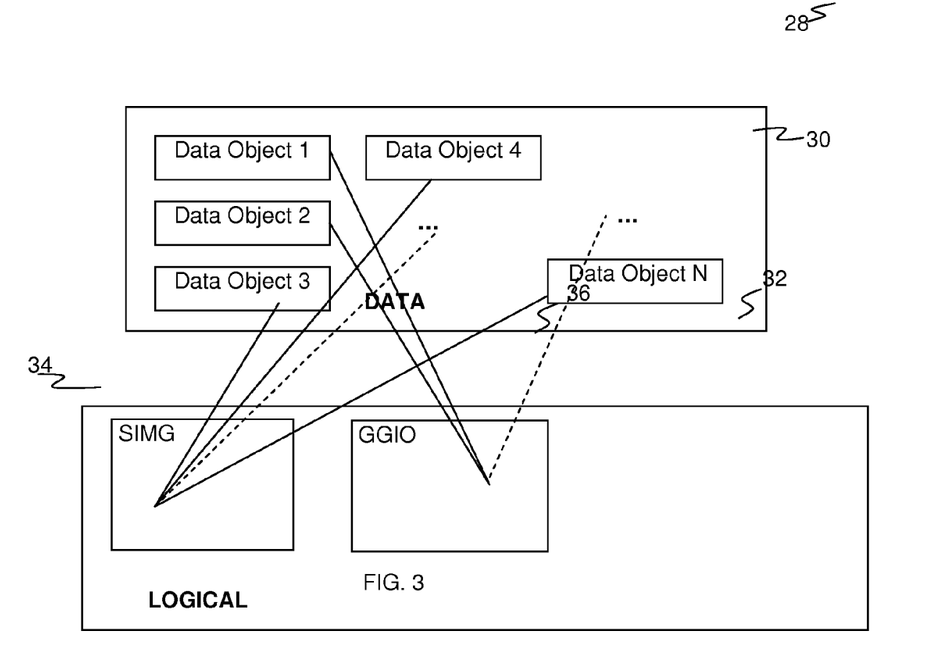
FIG. 3 is a diagrammatic representation for an IEC 61850 compliant IED that uses the adaptive IEC61850 data model in accordance with an exemplary embodiment.

FIG. 3 is a diagrammatic representation for an IEC 61850 compliant IED for example but not limited to Protection and Control relay IED and, Distributed Intelligent I/O IED indicated generally by reference numeral 28. In this example, the data objects 30 supported by the LN (logical nodes) 32, specifically SIMG (Gas Supervision) 34 and GGIO (General I/o) 36 are mapped to digital/binary/analog (single point or double point or counter or 4-20 mA transducer) inputs as physical field inputs and support of any of these LN classes by the IED is controlled based on the user inputs in the Configuration Tool. Thus data objects are allocated to different logical nodes (during configuration) which represent IED functionalities. With this flexibility, it is possible to support any new LN class that utilises digital/binary/analog inputs as its data objects.

In an exemplary implementation, the binary/analog inputs of the Distributed intelligent I/o, Protection & Control Relay are assigned for indicating the sensor related information like Insulation Alarm, Density Alarm etc., through SIMG LN using the IED configuration tool.

Similarly, the binary/digital inputs of the Distributed intelligent JO, Protection & Control Relay are assigned for indicating the generic alarm through GGIO LN using the IED application configuration tool.

Figure 4:
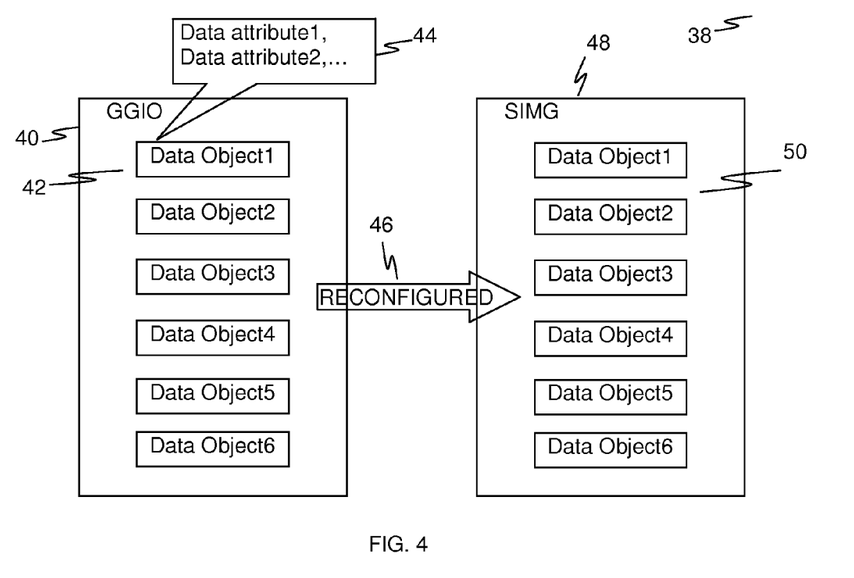
FIG. 4 is a diagrammatic representation for reconfiguring one logical node into other logical node, extending logical nodes, same data objects co-existing in different logical nodes in an IEC 61850 compliant IED.

Another feature of the dynamic modeling technique includes mapping a data object (DO) of an LN to other LNs dynamically in an IEC 61850 compliant IED. This feature enables the IEDs like Distributed & Intelligent I/O, Protection & Control Relay to map the same input type in various LNs based on the application with which the process information is associated with. Thus as shown in FIG. 4, the diagrammatic representation 38 indicates that the data objects 42 (through respective data attributes 44) that are associated with GGIO logical node 40 previously are reconfigured as represented by reference numeral 46 to another logical node 48, shown as SIMG and the associated data objects 50 that are same as data objects 42. Thus the IED can be configured to support GGIO or SIMG or both and the same Data objects can co-exist in different logical nodes

EXAMPLE

A digital input can be referred in GGIO for indication or general alarm and in SIMG for pressure alarm.

Yet another feature of the adaptive modeling technique includes extending data objects in LNs dynamically in an IEC 61850 compliant IED. This feature enables the IEC61850 compliant IEDs like a Distributed & Intelligent I/O device or a Protection & Control relay, to have many LN instances of the same class with varying number of data objects, that are configured dynamically based on predefined data object type information, instead of predefined LN type definitions.

Figure 5:
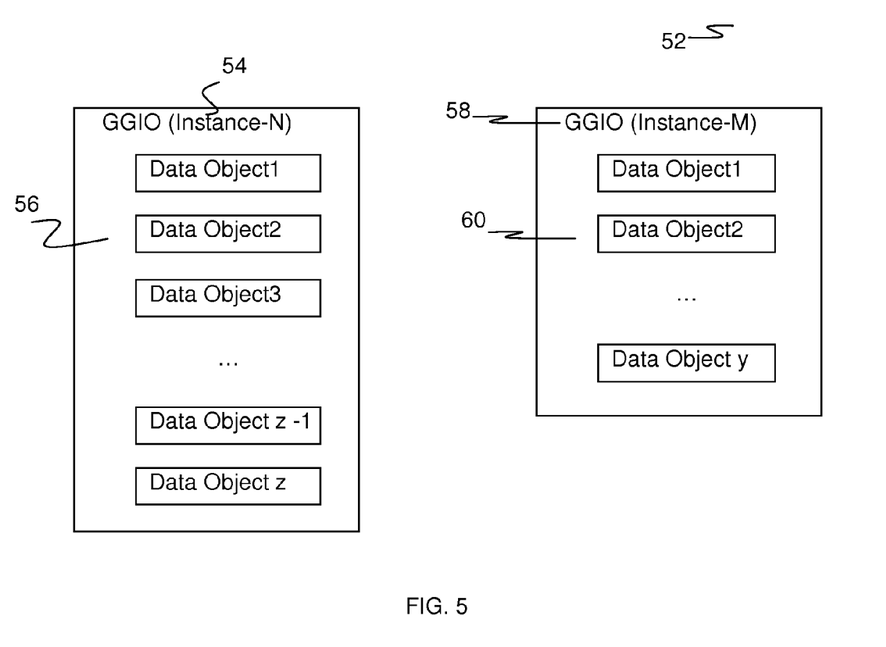
FIG. 5 is an diagrammatic representation for extending data objects in the same LN class dynamically in an IEC 61850 compliant IED.

FIG. 5 is a diagrammatic representation for logical node (LN) GGIO indicated by reference numeral 52 as showing different instances, instance—N indicated by reference numeral 54 and data objects 56 and another instance—M indicated by reference numeral 58 and data objects 60.

In another implementation the SIMG LN with instance number 1 and prefix SF6 is assigned with 3 data objects (analog inputs) for indications like pressure, temperature, etc., using the IED Configuration tool. The same SIMG LN is then assigned with 4 data objects (for binary inputs) and/or another instance of SIMG LN with 4 data objects can be created using the IED configuration tool. Thus the Protection and Control IED can be configured for having multiple instances of an IEC 61850 LN class with variable number of Data Objects in each of it.

In an exemplary implementation, the two GGIO LN Classes are associated with the same prefix, one with 2 Alm (Alarm) and 2 Ind (Indication) data objects and the other with 4 Alm (Alarm) and 2 Ind (Indication) data objects.

In yet another implementation, the Protection and Control Relay is able to extend Data Objects (based on analog information derived within the IED) assigned to multiple LN classes for an IEC 61850 compliant IED. The user can assign multiple analog data objects in an LN using the IED Configuration tool in offline mode as described earlier.

Yet another feature of the adaptive data model technique is supporting of multiple LN instances of an LN class dynamically in an IEC 61850 compliant IED, based on functionality.

EXAMPLE

An IEC 61850 compliant DCS Process controller IED that is used for Power control applications has for example 15 Control information to be passed onto other IEC61850 IEDs and it supports an LN type of PTRC class that is fixed for 10 data objects. In this case, during the dynamic SCL configuration process, the IED configuration tool dynamically creates 2 instances of PTRC LN.

Figure 6:
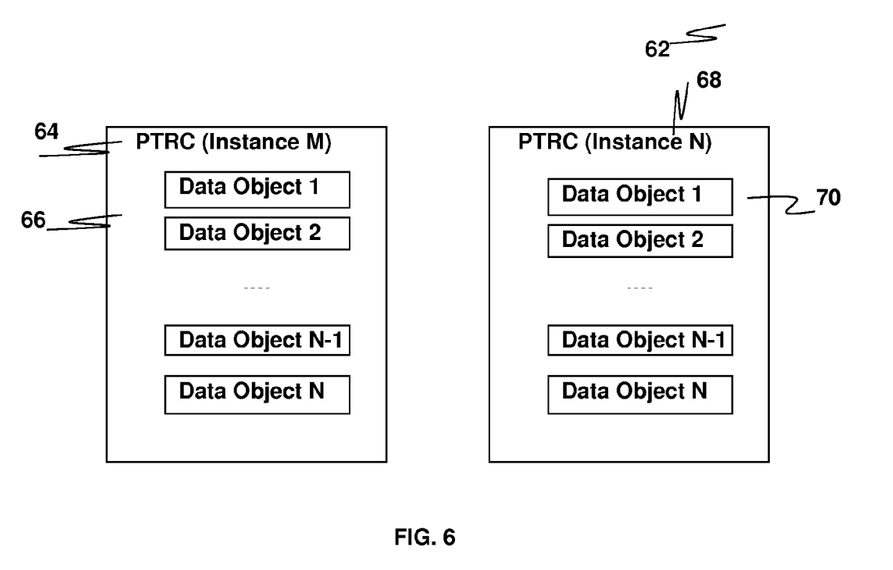
FIG. 6 is a diagrammatic representation of depicting the multiple instantiation of a logical node dynamically in an IEC 61850 compliant IED.

FIG. 6 is a diagrammatic representation for IEC 61850 compliant IED, for example but not limited to DCS Process Controller IED 62, depicting the multiple instantiation of LNs dynamically in an IEC 61850 compliant IED. If number of data objects in a logical node is fixed as shown in FIG. 6, where the data objects 66 and 70 are fixed, then multiple instances of the logical node, indicated by PTRC (Instance M) 64 and PTRC (Instance N) 68 are created to suit application requirements.

Figure 7:
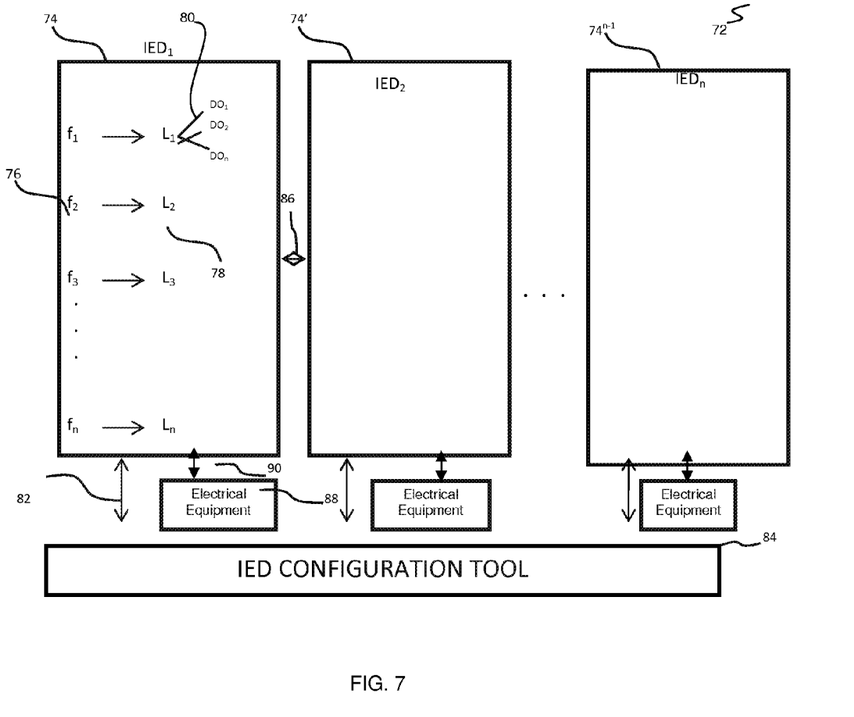
FIG. 7 is a block diagram representation of a Substation Automation apparatus comprising IEDs as an exemplary one implementation of the invention.

FIG. 7 is a diagrammatic representation of the substation automation system referred herein and is indicated by reference numeral 72. The substation automation system 72 includes several intelligent electronic devices (IEDs) shown by reference numerals 74, 74', 74" . . . 74n−1. Each of the IEDs have a dynamic capability, the dynamic capability is typically represented as a list of extendable functions, shown as f1 . . . fn indicated by reference numeral 76. Some examples of these functions include protection (over current, over voltage, frequency, reverse power), control, monitoring etc. Each function from this list of functions is represented as a Logical Node (LN), shown as $L_1 \ldots L_n$ indicated by reference numeral 78. It may be noted, that the logical node zero (LLNO) contains descriptions which are common to all other logical nodes inside the IED. Each Logical Node further represents several Data Objects (DO) 80, shown as $DO_1 \ldots DO_n$. The Data objects are defined in different IEDs depending on the internal addressing schemes. Data classes define meaningful information of applications located in the IEDs. The Common Data Classes (CDCs) have been defined for basic communication structure for the substation. These hold the member variables and services provided to the logical node related to the real-world data/parameter supported by the IED. According to aspects of the present technique these common data classes in the IED 74 are configured to construct corresponding data model templates, where each of the corresponding data model templates is configured to map the one or more logical nodes. The flexible data modeling technique employs a standard data representation using the common data classes. For example, an input status on a Distributed Intelligent I/O IED can be represented as Common Data Classes like single point status SPS, double point status DPS, measured value MV, or as an integer status INS. These data representations can be used by any logical node related to applications that require the above said status information.

The data published by the IED is shown generally by reference numeral 82. The system 72 includes an application configuration tool 84 as shown in FIG. 7, for configuring a subset of functions from the list of functions provided by the IED as described hereinabove, based on requirements of the substation. As would be apparent to one skilled in the art, a user can configure the IED by mixing and matching different functions according to the final application needed at the substation using the IED configuration tool 84. The IED configuration tool 84 dynamically configures one or more logical nodes by creating flexible data model templates using the one or more common data classes as described herein above.

Referring again to FIG. 7, the IED 74 in one exemplary embodiment is used to control and monitor the functioning of a local system equipment 88, for example an electrical equipment, such as a circuit breaker or a transformer. The IED 74 here typically performs protection, control, monitoring and metering in relation to the local system equipment 88, through a communication link 90. The system 72 may include HMIs (Human Machine Interface) and substation controllers (not shown), which may be interconnected via a computer communication network (not shown). These devices could then communicate shown generally by reference numeral via a communication network using the IEC 68150 communication standard.

It must be noted here that the firmware that includes the embedded software inside the IED as described in reference to FIG. 7 would support few common data model templates which are built based on the possible physical capabilities, the real world applications of these physical capabilities and corresponding IEC61850 Common Data Classes (CDCs). The application configuration tool needs to have the common understanding while creating the Substation Configuration Description Language (SCL) file, which has information for various LNs. When the LN type and the flexible data model template matches, the flexible data model is created supporting various new logical nodes that is built using supported CDCs. It should be noted here that though the description refers to IEC 61850 standard, standards, and the IEC 61850 standard is an exemplary non-limiting implementation of the above referred technique and systems. It may also be noted here that though the description refers to on-site application requirement, the same may be extended to general application requirements like standalone IED configuration, factory configuration etc.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. A method for configuring an intelligent electronic device (TED), the method comprising:
in a processor of the IED:
executing a flexible data modeling technique to dynamically adapt a data model based on one of an application output and a physical field input,
wherein the flexible data model technique comprises:
pre-creating a data structure for the plurality of data objects in a configuration tool environment and in firmware, wherein the data structure includes the one or more common data classes and corresponding short address fields;
creating a requisite number of data object instances for the plurality of data objects based on the dynamic capability of the IED;
generating a generic data model using the requisite number of data objects instances;
assigning a logical node class in the configuration tool environment based on the one of the application output and the physical field input; and
dynamically creating a requisite number of logical node instances corresponding to the logical node class using the plurality of data objects, wherein a logical node comprises the corresponding short address fields for the plurality of data objects corresponding to the logical node class.

2. The method of claim 1, wherein the flexible data modeling technique comprises:
supporting the one or more common data classes dynamically in the IED by using one or more digital/binary, or analog inputs as the physical field inputs for the plurality of data objects.

3. The method of claim 1, wherein the flexible data modeling technique comprises:
dynamically creating a plurality of logical node instances for one or more logical node classes with the plurality of data objects.

4. The method of claim 3, wherein the plurality of logical node instances comprise:
a varying number of data objects that are configured dynamically based on a predefined data object type information according to one of the application output and the physical field input.

5. The method of claim 1, wherein the flexible data modeling technique comprises:
pre-creating a generic data model template in a configuration tool environment and in firmware based on a dynamic capability of the IED;
assigning a logical node class based on one of the application output and the physical field input; and
dynamically creating a requisite number of logical node instances based on logical node type information from the generic data model template to build an adaptive data model.

6. A substation automation system comprising:
local system equipment;
a plurality of intelligent electronic devices (IEDs) associated with the local system equipment, wherein each of the plurality of IEDs comprises firmware for providing a dynamic capability in the IED; and
an IED configuration tool configured to interact with the firmware of each IED to configure the IED based on one of an application output and a physical field input, the application configuration tool having dynamic capability information for configuring the IED to execute a flexible data model including the steps of:
pre-creating a data structure for the plurality of data objects in a configuration tool environment and in firmware, wherein the data structure includes the one or more common data classes and corresponding short address fields;

creating a requisite number of data object instances for the plurality of data objects based on the dynamic capability of the IED;

generating a generic data model using the requisite number of data objects instances;

assigning a logical node class in the configuration tool environment based on the one of the application output and the physical field input; and dynamically creating a requisite number of logical node instances corresponding to the logical node class using the plurality of data objects, wherein a logical node comprises the corresponding short address fields for the plurality of data objects corresponding to the logical node class.

7. The substation automation system of claim 6, wherein each of the plurality of IEDs is configured to execute the flexible data model to dynamically create a plurality of logical node instances for one or more logical node classes of the IED with a plurality of data objects.

8. The method of claim 5, wherein the generic data model template is an IEC 61850 data model template.

* * * * *